C. P. CHAMBERLIN.
WIND SHIELD AND FRAME.
APPLICATION FILED AUG. 4, 1916.
1,286,530.
Patented Dec. 3, 1918.
2 SHEETS—SHEET 1.
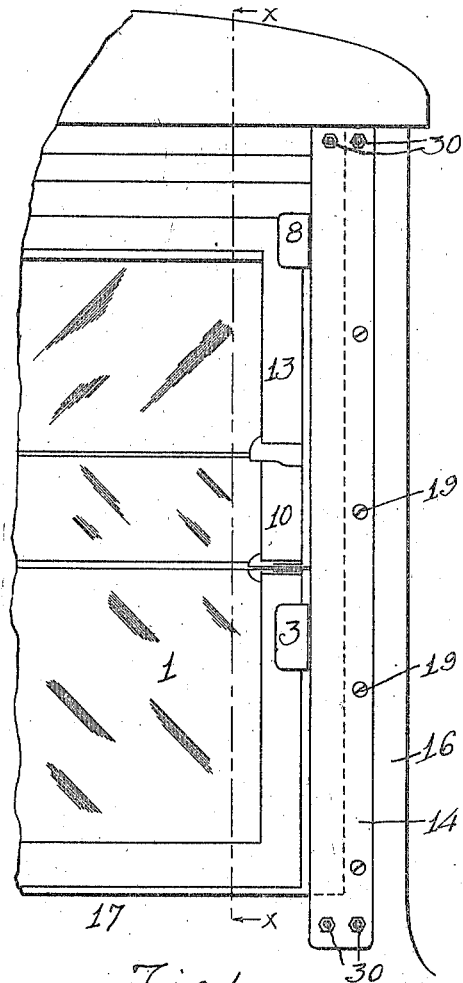
Fig. 1.
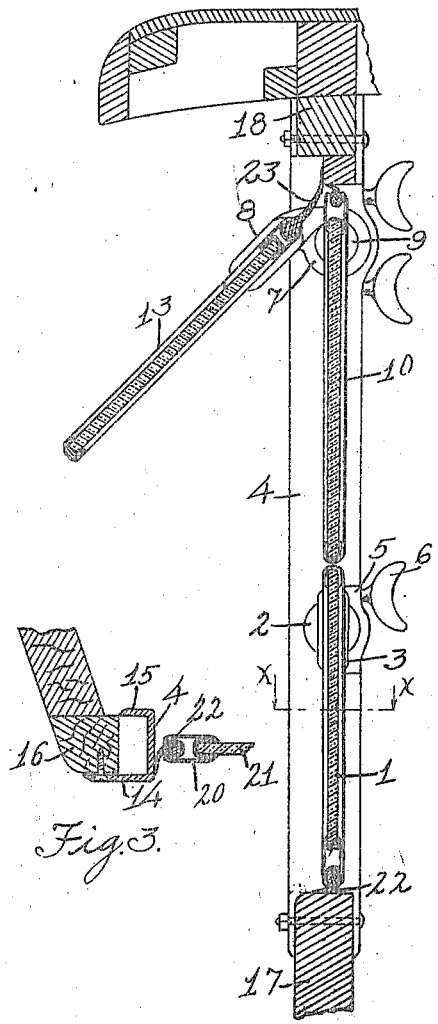
Fig. 3.
Fig. 2.
Inventor
CLARENCE P. CHAMBERLIN

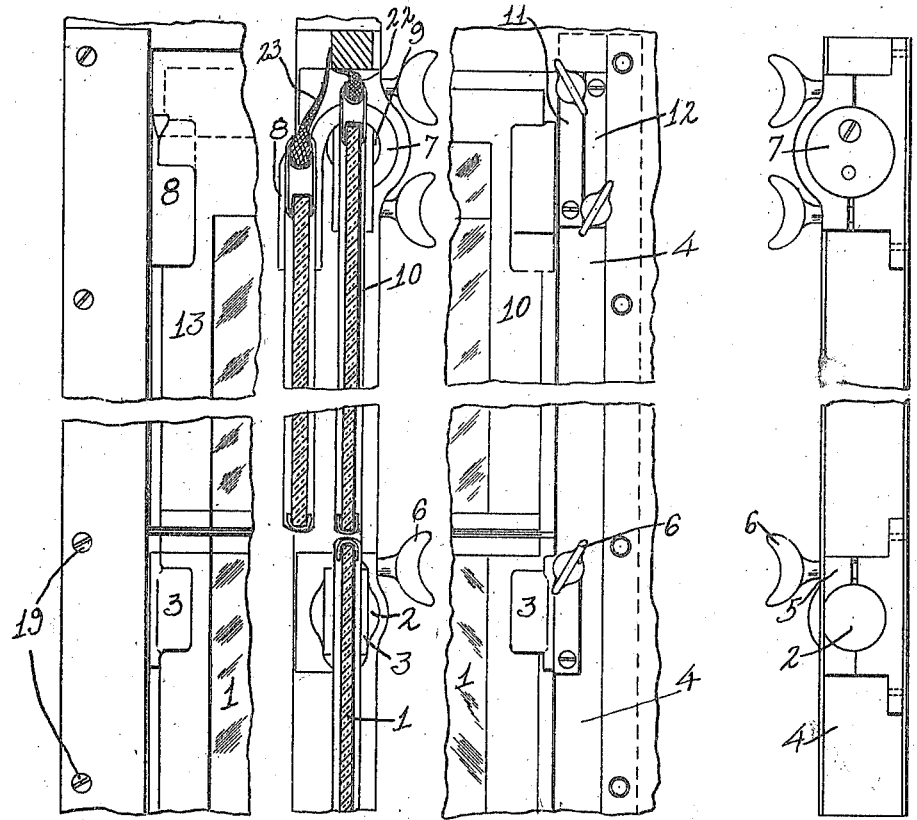
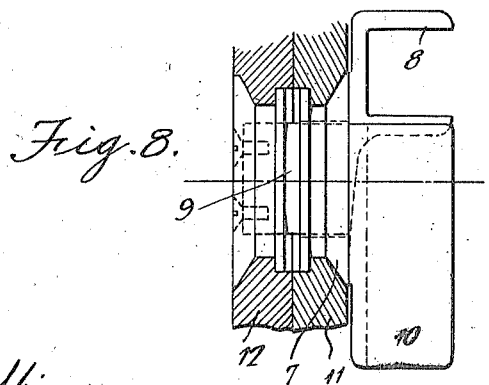

UNITED STATES PATENT OFFICE.

CLARENCE P. CHAMBERLIN, OF DETROIT, MICHIGAN, ASSIGNOR TO JOSEPH N. SMITH & COMPANY, OF DETROIT, MICHIGAN, A CORPORATION OF MICHIGAN.

WIND-SHIELD AND FRAME.

1,286,530.  Specification of Letters Patent.  Patented Dec. 3, 1918.

Application filed August 4, 1916.  Serial No. 113,031.

*To all whom it may concern:*

Be it known that I, CLARENCE P. CHAMBERLIN, a citizen of the United States, residing at Detroit, county of Wayne, State of Michigan, have invented a certain new and useful Improvement in Wind-Shields and Frames, and declare the following to be a full, clear, and exact description of the same, such as will enable others skilled in the art to which it pertains to make and use the same, reference being had to the accompanying drawings, which form a part of this specification.

This invention relates to windshields and frames therefor and its object is to provide a unit windshield and frame construction particularly adapted for use in closed tops for automobiles provided with an open forward end to receive the shield. In the manufacture of closed tops or bodies it has heretofore been necessary to form an opening of an exact width to fit the manufactured windshield and frame. The purpose of this invention is to provide a frame construction whereby the exactness heretofore required in forming the opening is avoided. This is accomplished in this present invention by forming parallel supporting frames on opposite sides which carry the hinge members for the several sections, the frame and sections being assembled as a unit for insertion in the body opening. The frames are formed with a laterally extending flange at the forward edge adapted to engage over the forward face of the side members of the opening in the body. By this arrangement a particular object of this invention is attained to provide a windshield and frame adapted to be assembled as a unit in the body opening, the frame construction being such that the exactness in the width of the opening is avoided as the frames by reason of the flange construction may be inserted within the opening to bring the windshields and sections in proper position relative to the body and the flange extending over the side of the opening, closing the interstice between the outer face of the frame members and the inner adjacent face of the opening. This construction allows considerable latitude as to width of the opening with which the frames and sections as a unit are adapted to be assembled and still form a tight joint therewith. A further object of the invention is to provide a frame and shield of the general nature stated having an adjustable rain shield or section and a plurality of pivoted sections each provided with gaskets adapted to engage the frames and close the apertures between the several sections.

These and other objects and the several novel features of the invention in its preferred form are hereinafter more fully described and claimed and shown in the accompanying drawings in which—

Figure 1 is a front elevation of a portion of a shield and supporting frame embodying my invention.

Fig. 2 is a cross section thereof taken on line $x$—$x$ of Fig. 1.

Fig. 3 is a cross section taken on line $x$—$x$ of Fig. 2.

Fig. 4 is a detail of the frame and a portion of the shield sections taken from inside.

Fig. 5 is a side elevation thereof.

Fig. 6 is a vertical section similar to Fig. 2 showing the rain shield portion folded parallel with the main shield.

Fig. 7 is a front elevation of the shield showing the rain shield portion folded as in Fig. 6.

Fig. 8 is a detail of the clamping members and hubs showing the mode of concentrically supporting the upper shield member and the adjustable rain shield.

Similar character refer to similar parts throughout the drawing and specification.

The main wind shield is formed of the lower glass section 1 the sash being pivoted to swing on a hub 2 carried by the sash support 3. The side frame 4 is recessed to receive the hub 2 and a block 5, formed to provide the other half of a bearing, is secured in the recess and provided with a thumb screw 6 by means of which the sash member 1 may be turned at any desired angle and frictionally held in position.

The frame member 4 is also provided with a bearing for a hub member 7 preferably formed integrally with the sash support 8. This hub member 7 is centrally apertured through which passes the hub member 9 of the upper sash 10 of the main wind shield. The hub 7 is short and is frictionally held in the same manner as the sash 1, there being a block 11 as will be understood from Fig. 4 by means of which it is bound in place. The hub member 9 extends through the hub 7 and is engaged by a similar bearing member 12 at the upper end of the frame 4 adjacent the block 11. The sash 13 of the rain shield thus is movable independently of the upper main shield 10 although rotatable about the same axis.

A frame member 4 of channel form is provided on each side of the shield having one flange 14 longer than the inner flange 15 and this flange 14 is secured to the upright member 16 of the top, as will be understood more readily from Figs. 1 and 3. These flanges 14 and 15 extend over the cross members 17 of the body as well as the upper cross member 18 thereof, as will be understood from Fig. 2. By this arrangement the shield may be entirely built up and assembled and sent to the body maker who simply secures it to the body frame with the several screws 19 in the outer flange member 14. With a wind shield unit as described but little thought or ingenuity is required on the part of the mechanic to assemble the same in an opening in the front of the top or body of the vehicle. By providing the frames with flanges as stated extending over the outer face of the frames of the body opening, the necessity of forming the opening of an exact width is avoided inasmuch as the interstice between the shield frames and the side frames of the opening is closed by the flange.

The sash members 20 of the several shield sections are preferably formed of metal having a channel around the inner edge to receive the glass 21, and also an outer channel to receive the inserted flexible strip or gasket 22, as will be understood from Fig. 3. This gasket has a flexible portion of such length as to engage the frame members 4 or the cross members of the body forming a wind and water proof joint therewith which is most desirable in a winter or closed top. Also to prevent the rain or sleet from running down onto the upper portion 10 of the shield, the forward shield portion 13 is provided with a strip 23 of comparatively extreme width to engage a cross bar of the body at all angles it may be set relative to the main portion of the shield.

By arranging all the thumb screws to project into the interior of the body or top of the vehicle, adjustments may be made from the interior thereof, as will be readily understood, and a particular feature of the invention resides in the channel side frames carrying the bearings for the several wind shield sections, and being of the channel formation shown adapting it for the securing to the side members of the body and to the cross bars, as stated.

As will be more readily understood from Figs. 1 and 2, the flanges of the frame members 4 are greater in length than the height of the opening in which the wind shield is placed. These flanges are secured at the ends to the upper and lower cross members of the windshield opening by means of bolts 30 thus tying the body members each side of the opening by a steel pillar strengthening the body and providing a rigid support for the shield sections. By the use of such frame members the body construction may be less expensively made being formed of light weight material.

Having thus briefly described my invention, its utility, and mode of operation, what I claim and desire to secure by Letters Patent of the United States is—

1. A windshield for closed vehicle bodies having a front opening comprising pivotally supported windshield sections, a frame member at each side thereof having bearings for the several sections, the frames and sections forming a unit and the said frames each having a laterally extending flange at the outer edge adapted to be secured against the outer faces of the frame of the body opening to close the interstice between the outer faces of the windshield frames and inner faces of the body frames.

2. In a device of the character described in combination with a closed body having a framed opening at the front for the reception of a windshield, vertical side frames each having laterally extending flanges at the front edge extending over the side frames of the opening, windshield sections pivotally supported by the frames, the width of the assembled sections and frames, exclusive of the flanges, being less than the width of the opening to allow ready insertion of the assembled frames as a unit in the body opening.

3. In combination with a vehicle body of the closed type having an opening at the front, a wind shield for closing said opening comprising vertical side members of channel form having one of the flanges greater in depth than the other adapted to be attached to the vertical sides of the opening, said flanges being greater in length than the opening to engage the upper and lower edges respectively thereof, means for securing said extending ends to the said edges respectively, wind shield sections pivotally mounted in said vertical side frames, and gaskets about said sections forming a tight joint between the sections and channel frames and between the upper and lower sections and adjacent edges of the opening.

4. In combination with a vehicle body of the closed type having a front opening therein, a wind shield frame comprising vertical members on each side of the opening of channel form, one of the flanges being greater in depth than the other for attachment to the side of the opening, and said flanges being greater in length than the opening to engage over the upper and lower edges respectively thereof, wind shield sections, and means for supporting the sections in the said frames.

In testimony whereof, I sign this specification.

CLARENCE P. CHAMBERLIN.